United States Patent
Stinson et al.

(10) Patent No.: US 7,112,282 B2
(45) Date of Patent: *Sep. 26, 2006

(54) FOUNTAIN SOLUTION RECYCLING SYSTEM FOR COMMERCIAL PRINTERS

(76) Inventors: David J. Stinson, 8002 E. Ridge La., Woodstock, GA (US) 30189; David A. Douglas, 817 Palm Desert Dr., Garland, TX (US) 75044; Roy E. Seibert, 2616 Greenway Dr., McKinney, TX (US) 75070; Jose A. Villarreal, 18060 County Road 4056, Kemp, TX (US) 75143

(*) Notice: Subject to any disclaimer, the term of this patent is extended or adjusted under 35 U.S.C. 154(b) by 0 days.

This patent is subject to a terminal disclaimer.

(21) Appl. No.: 11/198,430

(22) Filed: Aug. 5, 2005

(65) Prior Publication Data

US 2005/0279691 A1    Dec. 22, 2005

Related U.S. Application Data

(60) Continuation of application No. 10/910,862, filed on Aug. 4, 2004, which is a division of application No. 10/392,215, filed on Mar. 19, 2003, now Pat. No. 6,908,558.

(51) Int. Cl.
  *B01D 37/00* (2006.01)
  *B01D 29/56* (2006.01)
  *B01D 15/10* (2006.01)
  *B01D 15/18* (2006.01)
  *B41F 7/24* (2006.01)

(52) U.S. Cl. .................. 210/663; 210/669; 210/767; 210/805; 210/806; 210/195.1; 210/196; 210/251; 210/258; 210/259; 210/282; 210/287; 210/416.1; 210/502.1; 210/167; 101/147; 101/148; 101/364; 101/450.1

(58) Field of Classification Search ............ 210/660, 210/767, 805, 806, 807, 252, 258, 259, 282, 210/287, 502.1; 101/425, 483, 450.1, 147, 101/350.1, 350.5, 364, 148

See application file for complete search history.

(56) References Cited

U.S. PATENT DOCUMENTS

| | | | | |
|---|---|---|---|---|
| 181,597 A | * | 8/1876 | Robertson | 106/31.32 |
| 2,389,730 A | * | 11/1945 | Iler | 101/147 |
| 3,896,730 A | * | 7/1975 | Garrett et al. | 101/425 |
| 3,949,668 A | * | 4/1976 | Smith, Jr. | 101/148 |
| 3,959,129 A | * | 5/1976 | White et al. | 210/667 |

(Continued)

FOREIGN PATENT DOCUMENTS

JP    2001260310 A    9/2001

OTHER PUBLICATIONS

FloClear™ Homepage—3 pages; downloaded from: http://www.floclear.com/#Introduction on Apr. 28, 2006.*

(Continued)

*Primary Examiner*—Robert James Popovics
*Assistant Examiner*—T. Woodruff
(74) *Attorney, Agent, or Firm*—Michael A. O'Neil

(57) ABSTRACT

A method of and apparatus for extending the life of fountain solutions used in commercial printing presses comprises withdrawing fountain solution from the dampener recirculation system of a printing press and directing the withdrawn fountain solution through a sediment prefilter, a separation filter, and a post treatment filter. The sediment prefilter preferably comprises a melt blown polypropylene filter; the separation filter preferably comprises a diatomaceous earth filter; and the post treatment filter preferably comprises a zeolite filter.

3 Claims, 2 Drawing Sheets

U.S. PATENT DOCUMENTS

| | | | |
|---|---|---|---|
| 4,009,657 A * | 3/1977 | Bonanno et al. | 101/157 |
| 4,179,019 A | 12/1979 | Danziger | 196/46.1 |
| 4,384,523 A * | 5/1983 | Ryan | 101/210 |
| 4,391,638 A * | 7/1983 | Fusco et al. | 106/31.64 |
| 4,565,638 A * | 1/1986 | Zucker | 210/774 |
| 4,574,695 A * | 3/1986 | Ryan | 101/148 |
| 4,608,158 A * | 8/1986 | Ghisalberti et al. | 210/96.1 |
| 4,738,785 A * | 4/1988 | Langston et al. | 210/738 |
| 4,754,779 A * | 7/1988 | Juhasz | 137/565.33 |
| 4,778,604 A * | 10/1988 | Leonard et al. | 210/664 |
| 4,818,284 A * | 4/1989 | McKelvey | 106/31.32 |
| 4,874,515 A * | 10/1989 | McKelvey | 210/360.1 |
| 5,017,291 A * | 5/1991 | Semler et al. | 210/641 |
| 5,124,736 A * | 6/1992 | Yamamoto et al. | 396/631 |
| 5,177,975 A * | 1/1993 | Mertens | 62/64 |
| 5,181,467 A * | 1/1993 | Takekoshi | 101/147 |
| 5,200,094 A * | 4/1993 | Hill et al. | 210/768 |
| 5,201,943 A * | 4/1993 | Monnerat | 106/31.13 |
| 5,344,573 A * | 9/1994 | Hill et al. | 210/768 |
| 5,415,091 A * | 5/1995 | Junghans | 101/147 |
| 5,489,379 A * | 2/1996 | Meenan et al. | 210/167 |
| 5,505,863 A * | 4/1996 | Danon et al. | 210/774 |
| 5,622,620 A * | 4/1997 | Meenan et al. | 210/130 |
| 5,628,914 A * | 5/1997 | Prasil | 210/770 |
| 5,702,603 A | 12/1997 | Johnson et al. | 210/493.1 |
| 5,734,944 A * | 3/1998 | Seeley et al. | 396/565 |
| 5,811,224 A * | 9/1998 | Seeley et al. | 430/399 |
| 5,828,923 A * | 10/1998 | Harabin et al. | 396/626 |
| 6,126,336 A * | 10/2000 | Ferrante | 396/565 |
| 6,153,107 A * | 11/2000 | Ogawa et al. | 210/710 |
| 6,224,273 B1 * | 5/2001 | Ferrante | 396/565 |
| 6,247,856 B1 * | 6/2001 | Shibano et al. | 396/565 |
| 6,293,198 B1 * | 9/2001 | Mizuno | 101/483 |
| 6,488,754 B1 * | 12/2002 | McPherson et al. | 106/163.01 |
| 6,908,558 B1 * | 6/2005 | Stinson et al. | 210/660 |
| 2004/0182796 A1 * | 9/2004 | Stinson et al. | 210/806 |
| 2005/0006294 A1 * | 1/2005 | Stinson et al. | 210/259 |
| 2005/0242019 A1 * | 11/2005 | Stinson et al. | 210/259 |
| 2005/0252860 A1 * | 11/2005 | Stinson et al. | 210/659 |
| 2005/0279691 A1 * | 12/2005 | Stinson et al. | 210/259 |
| 2005/0284804 A1 * | 12/2005 | Stinson et al. | 210/259 |

OTHER PUBLICATIONS

FloClear™ Presentation including testimonials—20 pages; Downloaded from: http://www.floclear.com/floclearPres.pdf on Apr. 28, 2006.*

FloClear™ Advantage—2 pages; downloaded from: http://www.floclear.com/FloClear%20Advantage.pdf on Apr. 28, 2006.*

FloClear™ Brochure—2 pages; downloaded from http://www.floclear.com/FloClearbro.pdf on Apr. 28, 2006.*

* cited by examiner

FOUNTAIN SOLUTION RECYCLING SYSTEM FOR COMMERCIAL PRINTERS

CROSS-REFERENCE TO RELATED APPLICATIONS

This application is a continuation application of application Ser. No. 10/910,862 filed Aug. 4, 2004, currently pending, which is a divisional application of application Ser. No. 10/392,215 filed Mar. 19, 2003, now U.S. Pat. No. 6,908,558.

TECHNICAL FIELD

This invention relates generally to improvements in commercial printing systems and more particularly to a system for removing contaminants from and thereby extending the life of fountain solutions utilized in commercial printing plants.

BACKGROUND AND SUMMARY OF THE INVENTION

A typical offset lithographic printing press has a plate cylinder upon which the negative of the text and illustrations to be printed are etched by a photographic and/or an electronic process. Dampening rollers apply a fountain solution to the plate cylinder which adheres to the plate cylinder except in the areas in which the text and illustrations are located.

Next, a series of form rollers, also known in the art as inking rollers, apply a layer of ink to the plate cylinder. The ink adheres to the plate cylinder only in the etched areas comprising the text and illustrations.

The plate cylinder then presses the inked text and illustrations onto a rubber blanket cylinder. An impression cylinder then presses a sheet of paper or other substrate to be printed against the blanket cylinder as the paper or other substrate passes between the blanket cylinder and the impression cylinder. The inked text and illustrations on the blanket cylinder are transferred onto the paper or other substrate to effect printing thereof.

Over time, ink, paper fiber, spray powder, and other contaminants build up in the fountain solution. These contaminants negatively impact print quality. Additionally, as the fountain solution degrades water adjustments are required. Eventually the fountain solution becomes so contaminated that it needs to be replaced. The present invention comprises a system for minimizing fountain solution contamination thereby extending the useful life of the fountain solution by a substantial period of time.

The fountain solution recycling system of the present invention utilizes a unique multi-stage separation technology and a recirculation pump to clean and restore the fountain solution. Removal of contaminants is achieved by processing the solution through three separate treatment stages resulting in a reusable, stabilized fountain solution. Components of the fountain solution which are consumed due to carry-off by the printing substrate and evaporation are replaced in the conventional manner.

Use of the fountain solution recycling system of the present invention easily and reliably reduces costs and improves productivity in an aspect of the commercial printing business that has traditionally been neglected. Simply extending the life of the fountain solution typically adds 1–2 hours of productivity per week per printing press because changing the fountain solution and cleaning the system are no longer required.

Additionally, by extending the life of the fountain solution waste disposal costs associated with fountain solution replacement are dramatically reduced. In those instances in which spent fountain solution is drained, use of the present invention greatly reduces the copper, zinc, ink, glycols, phosphates and suspended solids going into the drain thereby lessening the impact on the environment.

BRIEF DESCRIPTION OF THE DRAWINGS

A more complete understanding of the present invention may be had by reference to the following Detailed Description when taken in connection with the accompanying Drawings, wherein.

DETAILED DESCRIPTION

Figure 1:
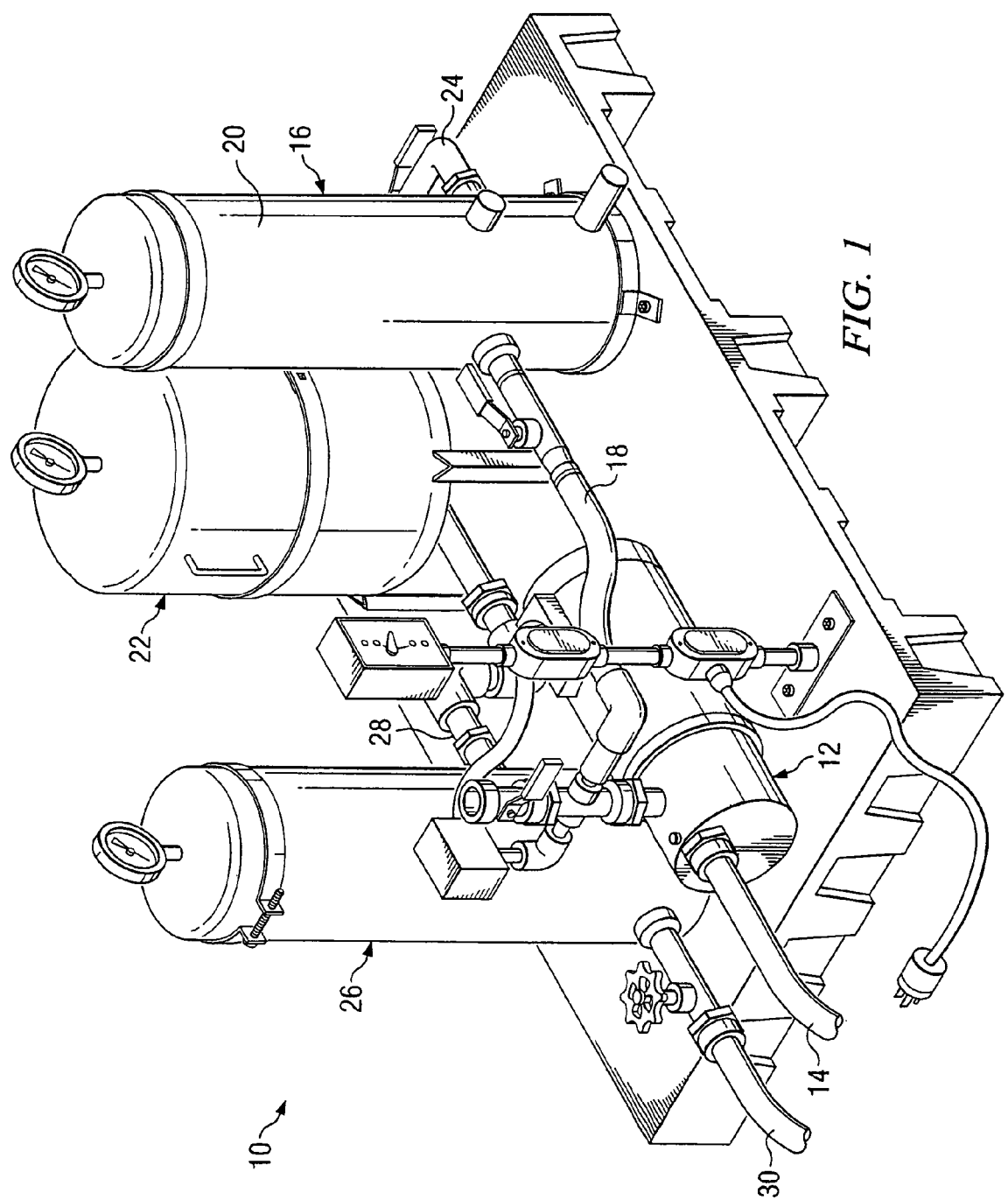
FIG. 1 is a perspective view of a fountain solution recycling system for commercial printers incorporating the invention.

Referring now to the Drawings, and particularly to FIG. 1 thereof, there is shown a fountain solution recycling system 10 incorporating the present invention. The system 10 includes a pump 12 which receives fountain solution from a commercial printing press through a line 14. The output of the pump 12 is directed to a sediment prefilter 16 through a line 18. The sediment prefilter 16 comprises a housing 20 which contains a strainer or filter formed from melt blown polypropylene and having a consistency generally similar to that of a fibrous web. The function of the sediment prestrainer 16 is to remove relatively large particles from the flowing fountain solution.

From the sediment prefilter 16 the fountain solution is directed to a separation cartridge 22 through a line 24. The separation cartridge 22 comprises a housing which contains a diatomaceous earth filter and functions to remove submicron sized particles from the flowing fountain solution. Thus, having passed through the sediment prefilter 16 and the separation cartridge 22 the fountain solution is substantially free of particulate and colloidal contaminants.

From the separation cartridge 22 the fountain solution is directed to a post treatment cartridge 26 through a line 28. The post treatment cartridge 26 comprises a housing which contains a natural zeolite filter material which removes copper ions, zinc ions, and other ions from the flowing fountain solution thereby substantially removing metal ion contaminants from the fountain solution. After flowing through the post treatment cartridge 26 the fountain solution is returned to the dampener recirculating device of the commercial pressing press through a line 30.

The sediment prefilter 16, the separation filter 22, and the post treatment filter 26 comprise a three stage treatment system in which each stage has a symbiotic relationship with the former stage. The use of the combined system comprising the prefilter 16, the separation filter 22, and the post treatment filter 26 affords two highly beneficial results. First, the use of the combined system substantially extends the life of fountain solution flowing therethrough. Second, the combined system renders the fountain solution much more environmentally friendly upon ultimately disposal.

Figure 2:
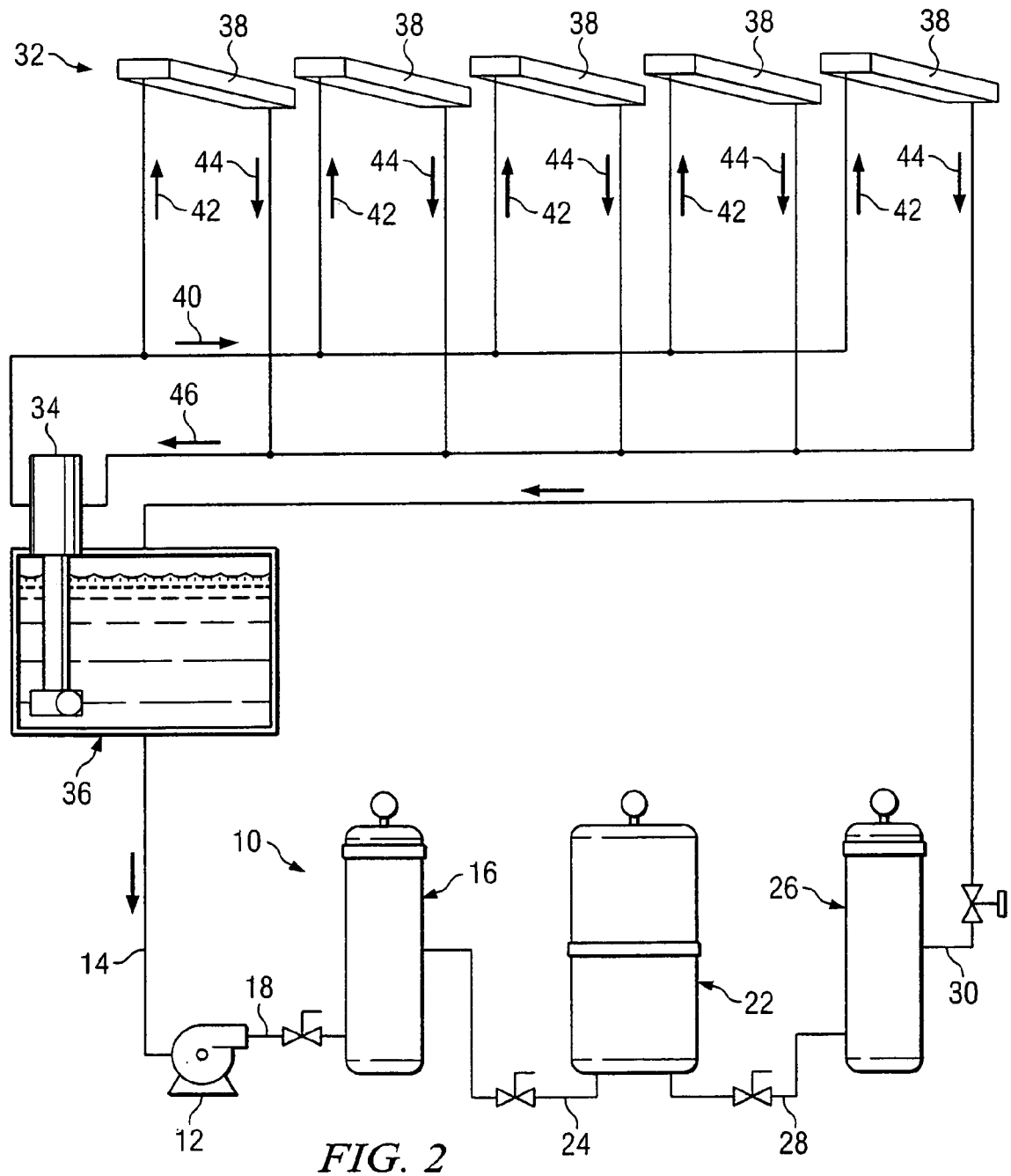
FIG. 2 is a schematic illustration of the fountain solution recycling system of FIG. 1 and the interaction thereof with a commercial printing press.

FIG. 2 illustrates the use of the fountain solution recycling system 10 in conjunction with a commercial printing press 32. A recirculation pump 34 withdraws fountain solution from a fountain solution recirculation tank 36 and directs the fountain solution to one or more printing press dampener pans 38 as indicated by the arrows 40 and 42. From the printing press dampener pans 38 the fountain solution is applied to dampening rollers which in turn apply the fountain solution to the plate cylinder of the printing press 32. In the operation of the printing press 32 fountain solution is continuously withdrawn from the printing press dampener pans 38 and returned to the tank 36 as indicated by the arrows 44 and 46.

The fountain solution recycling system 10 of the present invention withdraws fountain solution from the tank 36 through the line 14 and returns the fountain solution to the tank 34 through the line 30. Thus, the system 10 of the present invention functions to maintain the fountain solution within the tank 36 in a substantially clean condition characterized both by a lack of particulate contamination and a reduction of metal ion contamination.

As is best known in FIG. 1, the components of the fountain solution recycling system of the present invention may be mounted on a pallet. By mounting all of the components of the system on a pallet installation of the system at convenient location within a commercial printing plant is readily accomplished. All that remains to be done is the connection of the lines 14 and 30 to one or more printing presses within the plant, whereupon operation of the system can be commenced.

EXAMPLE

A typical eight-color 40" printing press requires the disposal of about 40 gallons of fountain solution per week, or about 2100 gallons per year. 2100 gallons equals about 40 barrels of spent fountain solution that must be disposed of annually. At a typical disposal cost of about $250/barrel the annual fountain solution disposal cost is about $10,000 per year per printing press. Conversely, when the present invention is used the annual fountain solution disposal requirement is about 2 barrels or about $500 per year per press. Elimination of press downtime for fountain solution change out is another benefit resulting from the use of the present invention. At just one hour of eliminated downtime per week the use of the present invention saves over $15,000 per year per press. When down time savings are combined with disposal cost savings use of the present invention results in about $25,000 in annual savings per press.

Although preferred embodiments of the invention have been illustrated in the accompanying Drawings and described in the foregoing Detailed Description, it will be understood that the invention is not limited to the embodiments disclosed, but is capable of numerous rearrangements, modifications, and substitutions of parts and elements without departing from the spirit of the invention.

The invention claimed is:

1. A method for maintaining the quality of commercial printing press fountain solution circulated through a printing press having a fountain solution circulation system comprising a fountain solution recirculation pump for withdrawing fountain solution from a fountain solution tank and circulating the fountain solution through the printing press and back to the fountain solution tank comprising the steps of:
   providing side stream loop means independent from the fountain solution circulation system;
   providing means for removing particulate matter from the fountain solution, said means for removing particulate matter from the fountain solution comprises at least one filter housing having a filter contained therein;
   utilizing the side stream loop means to withdraw fountain solution from the fountain solution tank and thereafter directing the withdrawn fountain solution through the means for removing particulate matter from the fountain solution; and
   returning the withdrawn fountain solution from the particulate matter removal means to the fountain solution tank of the fountain solution circulation system.

2. The method according to claim 1 wherein the means for removing particulate matter from the fountain solution comprises multiple separate and distinct filter housings each having a filter mounted therein.

3. The method according to claim 2 wherein the multiple separate and distinct filter housings each having a filter mounted therein comprise a three-stage treatment system with each stage having a symbiotic relationship with the former stage.

\* \* \* \* \*